United States Patent
Newsome et al.

(10) Patent No.: US 6,595,416 B1
(45) Date of Patent: Jul. 22, 2003

(54) SYSTEM FOR RAPIDLY DISPENSING AND ADDING VALUE TO FARE CARDS

(75) Inventors: Matthew J. Newsome, San Diego, CA (US); Graham H. Hilton, San Diego, CA (US); Paula M. Miller, San Diego, CA (US); Jesse Shackleford, San Diego, CA (US); Chad S. Sanfilippo, Ramona, CA (US); Mark Varney, West Sussex (GB); Kevin Bryant, Surrey (GB); Gavin Ford, Surrey (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 09/693,386

(22) Filed: Oct. 20, 2000

Related U.S. Application Data (60) Provisional application No. 60/160,681, filed on Oct. 21, 1999.

(51) Int. Cl.[7] .................................................. G06F 7/08
(52) U.S. Cl. ....................... 235/381; 235/380; 235/383; 235/384; 705/13
(58) Field of Search ................................ 235/380, 381, 235/383, 384; 705/13, 39, 41

(56) References Cited

U.S. PATENT DOCUMENTS

| | | | | |
|---|---|---|---|---|
| 4,992,647 A | * | 2/1991 | Konishi et al. | 235/379 |
| 5,352,876 A | | 10/1994 | Watanabe et al. | |
| 5,409,092 A | * | 4/1995 | Itako et al. | 194/210 |
| 5,550,360 A | * | 8/1996 | Muraoka | 235/384 |
| 5,754,654 A | * | 5/1998 | Hiroya et al. | 705/76 |
| 5,969,332 A | * | 10/1999 | Ueda et al. | 235/492 |

FOREIGN PATENT DOCUMENTS

| | | | | |
|---|---|---|---|---|
| EP | 0 380 377 A1 | 8/1990 | | |
| EP | 0 608 197 A1 | 7/1994 | | |
| EP | 713198 A2 | * 5/1996 | | G07F/7/08 |
| EP | 0 789 331 A1 | 8/1997 | | |
| GB | 2 267 626 | 12/1993 | | |
| GB | 0 797 174 A2 | 9/1997 | | |
| GB | 2 317 258 | 3/1998 | | |
| JP | 02254585 A | * 10/1990 | | G07B/1/00 |
| JP | 06131521 A | * 5/1994 | | G07B/5/00 |
| JP | 09062882 A | * 3/1997 | | G07B/15/00 |
| JP | 2000137840 A | * 5/2000 | | G07B/15/00 |
| JP | 20000322614 A | * 11/2000 | | G07B/15/00 |
| WO | WO 200129774 A2 | * 4/2001 | | G07B/11/00 |

OTHER PUBLICATIONS

Singapore Transit Authority Awards Cubic Transportation System $23.6 Million Contract For Smart Card Ticketing Machines, Apr. 1999, Cubic Corporation, 1999 Press Releases.*

Cubic Receives $33.4 Million Order From MTA New York City Transit For Additional MetroCard Vending Machines, Jun. 1999 Cubic Corporation, 2000 Press Releases.*

Metro Launches Test of New Fareboxes in 80 Buses—New Fareboxes Accept SmarTrip Cards, Nov. 2002, WMATA, Metro Press Release.*

SmarTrip More than a Smart Card. It's Pure Genius, 1998–2002, WMATA, SmarTrip.*

* cited by examiner

Primary Examiner—Thien M. Le
Assistant Examiner—Uyen-Chau Le
(74) Attorney, Agent, or Firm—Brown, Martin, Haller & McClain, LLP (57) ABSTRACT

An add value terminal provides an automatic fare collection environment with a compact, easy to use, and easy to install device that re-values and issues transit fare cards exclusively utilizing credit and debit functions. The add value terminal alleviates long lines often associated with automatic vending machines that allow bill and coin transactions. The add value terminal also can sell tickets in out-of-station environments including malls, grocery stores, post offices, and airports.

20 Claims, 4 Drawing Sheets

SYSTEM FOR RAPIDLY DISPENSING AND ADDING VALUE TO FARE CARDS

This application claims priority under 35 U.S.C. 119(e) to provisional U.S. Patent Application No. 60/160,681 filed Oct. 21, 1999.

BACKGROUND OF THE INVENTION

1. Field of Invention

The present invention relates generally to terminals for adding monetary value to fare cards, and more specifically to a debit/credit only terminal for adding monetary value to fare cards and/or smart cards.

2. Background

The use of fare cards in mass transit systems has reached record levels with the successful introduction of free transfers, unlimited passes, and fare pricing systems based on distance traveled, time of day, and user categorization including age and frequent user. Automatic fare collection utilizing fare cards increases security through the elimination of person-to-person cash exchanges, decreases operating costs based upon a decrease in required personnel and an automation of system accounting, and improves commuter convenience by eliminating ticket window lines and ticket purchases for each transit system ride.

Fare cards are available in various formats including magnetic strip cards, contact smart cards and contactless smart cards. The fare cards may be purchased at automatic vending machines utilizing bills/coins, credit, and/or debit cards. The value of the card may be limited to the value of a single transit fare, or may exceed the value of a single transit fare so that the card may be used for multiple fares. A fare card having a value exceeding one transit fare offers an advantage of a single financial transaction for multiple rides. In addition, since the fare collection systems deduct value automatically for time and/or distance based fares, the rider does not need to compute exact fare amount as long as the amount on the card exceeds the required fare, and thus, the time the rider spends at a fare card dispensing machine is shortened. Any monetary value remaining on the card is usable for a subsequent fare. Fare cards also offer the advantage of being reusable. The transit rider inserts a used card into an automatic fare vending machines along with a payment means including bills/coins, or credit/debit cards, and a corresponding added value is stored on the fare card.

Current automatic vending machines offer the above stated advantages of reuse of a card and quick transaction times. However, during peak commuter hours, commuters are often faced with lines at the automatic fare vending machines. Delays in obtaining upgraded fare cards often are caused by bill/coin transactions and the cumbersome process of commuters having to insert coins and bills into a vending machine. In particular, a common experience for a commuter is to have a bill rejected multiple times because the bill is folded, creased and/or worn. Thus, as a commuter is fumbling with coins and cash, or is attempting to coerce a bill into a machine, other commuters have no choice but to wait in line for an available machine. Bill and coin machines also have a disadvantage of shortened expected mean cycle between failures due to the mechanical components, required for accepting bills and coins, that are apt to fail or malfunction. These vending machines present a further disadvantage of a vandalism target since the machines are known to hold cash.

Thus, there is a continuing effort to enhance the mean cycle between failure and the capacity of an automatic fare collection (AFC) system to allow for value and time replenishment of existing fare cards in a time efficient manner. A further pressing need is to provide an add value/time capability for all card types, including magnetic strip cards and smart cards, within the existing AFC system locations, commonly located in subway/train systems, and in locations outside the AFC system such as bus terminals. Availability of a fare card terminal is of particular value to bus patrons and those who do not have ready access to a subway/train station.

SUMMARY OF THE INVENTION

It is an advantage of the present invention to provide a means for adding value to cards by patrons employing solely credit/debit payment mechanisms.

It is a further advantage to improve the overall mean cycle between failure of an add value machine.

It is still a further advantage of the present invention to improve commuter satisfaction by providing an add value machine that requires less transaction time.

Yet another advantage is to provide a machine for adding value to fare cards that is easy to install and compatible with the existing automatic fare collection system.

It is yet another advantage to provide a compact machine for installation into locations outside of the transit system.

An add value terminal of the exemplary embodiment provides a quick and simple means of adding value to a fare card or contactless smart card using only a debit or credit card. Add value terminals shorten customer lines for customers waiting to upgrade their fare cards because simple credit/debit transactions require less time than transactions involving bills and coins. Thus, an add value terminal expedites the purchase of fare cards at automatic vending machine locations by attracting patrons to credit/debit terminals that do not accept bills and coins.

An add value terminal of the exemplary embodiment is a compact cabinet that may be installed on a wall, pedestal, or pillar. The terminal has a user friendly interface that utilizes a display, selection buttons, raised lettering, Braille, and an audio output jack to prompt and instruct a patron through the steps required to add value, upgrade, or verify the status of his or her fare card. The add value terminal of the exemplary embodiment accepts both magnetic strip fare cards and contactless smart cards. The term "fare card" as used herein includes both magnetic strip and contactless cards unless there is a stated card-type distinction. The magnetic strip fare cards are inserted into a fare card bezel to allow a ticket transport to read data from the card. Contactless smart card data is communicated to the add value terminal through the use of a smart card interface. The patron simply moves the smart card past a contactless smart card reader each time he or she is prompted to do so by the display.

The display of the add value terminal prompts a patron to insert a fare card. Once the fare card is inserted into the bezel or waved past the contactless smart card reader, the status of the fare card is displayed. The add value terminal of the exemplary embodiment displays the current period and card expiration dates, the remaining value, the number of rides remaining and/or the upgrade status of the card. The display then prompts the patron to make a selection of a desired transaction. The patron selects the transaction type by pressing a selection button as indicated by the display prompts. Typical transactions of the exemplary embodiment include verifying card status, upgrading the card, adding value, and/or adding time to the card. A patron may cancel a transaction at any time by pressing a cancellation button.

After the patron has selected a transaction type, the display prompts the patron for a method of payment. The patron presses the appropriate selection button and inserts a credit or debit card into a credit/debit card reader and enters any required personal identification numbers on a PIN keypad. The add value terminal communicates the debit/credit information to a bank authorization network. Once verification is received, the patron selects the time, value, or upgrade status to be added to the card. The add value terminal updates the card status as the magnetic strip card is removed from the bezel, or as the card is passed in front of the smart card reader. If the patron chooses to receive a transaction receipt, a printer receipt is delivered to the patron through the printer cup located on the add value terminal cabinet.

The add value terminals of the exemplary embodiment are connected through station controllers and associated communication network equipment to a transit system area controller utilizing existing four wire digital lines or fiber optic lines. The transit area controller monitors both out-of-system and in-system add value terminals. Out-of-system refers to add value terminals that are located outside of a transit system terminal. Typical out-of system locations include grocery stores, malls, bus terminals, and airports. In-system add value terminals are located in the transit system station, e.g. a train/subway station, and are networked with other automatic vending machines, token booths, turnstile equipment and fare card readers to the area controller.

The elimination of bill/coin transactions improves the overall Mean Cycle Between Failure (MCBF) statistics, decreases the cost of money collection and processing, and lowers the maintenance costs of the transit system automatic vending services. The primary benefits of the add value terminal include a low initial capital cost through the incorporation of existing transit system components into the add value terminal design, high reliability and low maintenance due to the increase in MCBF, a small compact cabinet, low security risk because the machine contains no cash or pre-valued fare media, fare card re-use, ease of use, low cost of installation, and common spares with existing transit system equipment.

BRIEF DESCRIPTION OF THE DRAWINGS

The present invention will be better understood from the following detailed description of a first embodiment of the invention, taken in conjunction with the accompanying drawings in which like reference numerals refer to like parts and in which.

DESCRIPTION OF THE PREFERRED EMBODIMENT

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
| --- | --- |
| AFC | Automatic Fare Collection |
| AVT | Add Value Terminal |
| AVM | Automatic Vending Machines |
| CSC | Contactless Smart Cards |
| MCBF | Mean Cycle Between Failure |

The add value terminal of the present invention is designed for commuter convenience by lessening the time required to purchase, upgrade, add value, or add time to a fare card. An add value terminal (AVT) of the preferred embodiment is a terminal for dispensing and/or adding value to fare cards, including magnetic strip cards and contactless smart cards, utilizing credit and debit accounts only. For commuters that must purchase a new fare card, the add value terminal also adds value to ready-for-sale fare cards that may be located in a separate simple storage hopper, mounted on the outside of the add value terminal cabinet, or supplied by a co-located host facility or organization such as a merchant or service organization.

Figure 1:
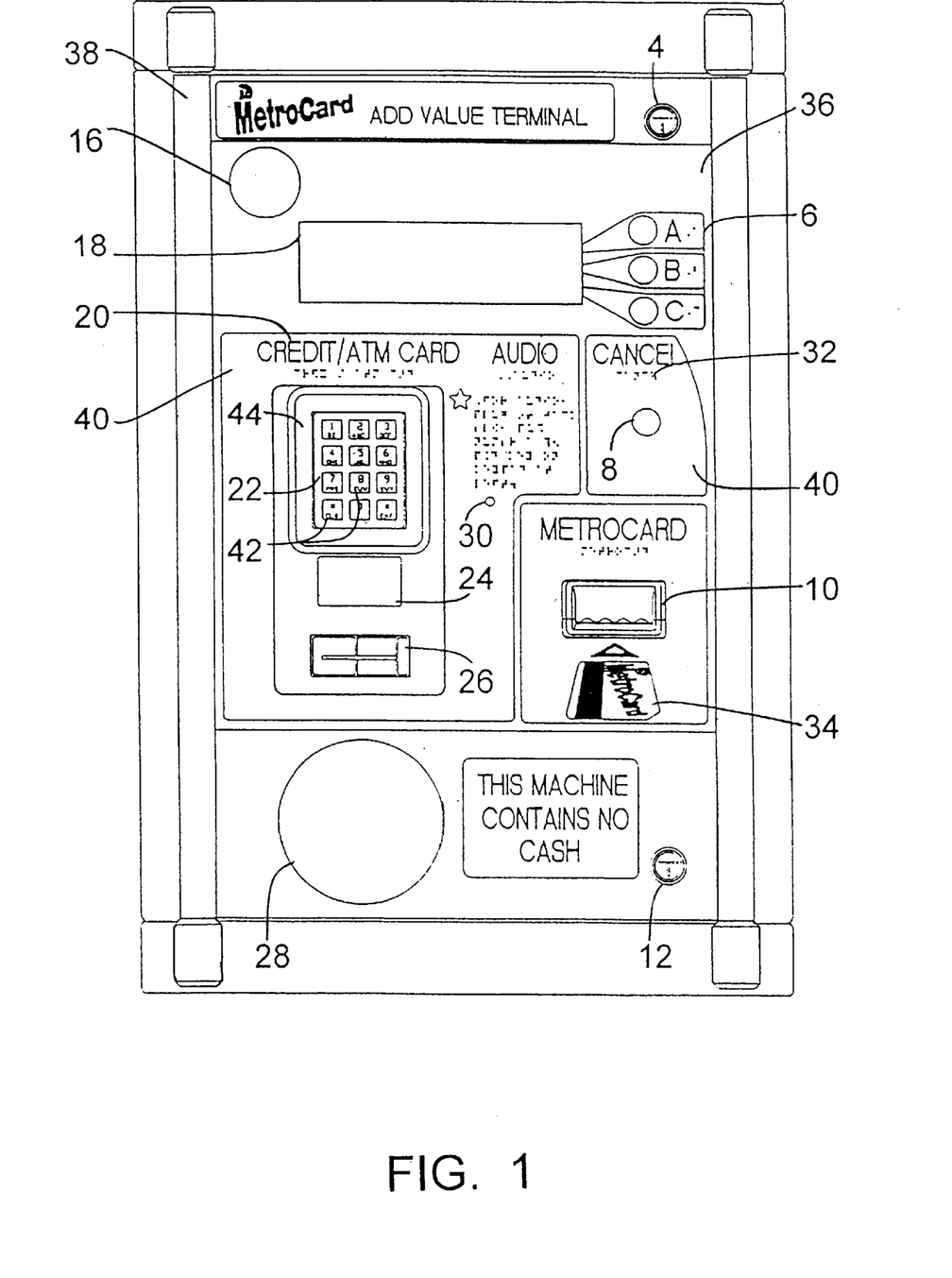
FIG. 1 is a front view of a preferred embodiment of an add value terminal for rapidly dispensing and adding value to a fare card.

Referring to FIG. 1, the add value terminal cabinet 2 of a preferred embodiment measures approximately 30.25" (76.84 cm) in height, 18" (45.72 cm) in width, and 10.5" (26.67 cm) in depth. The AVT cabinet 2 of other embodiments may be configured to fit within a pre-existing space, for example, where the AVT cabinet 2 replaces another automatic vending machine. The AVT cabinet 2 of a preferred embodiment is made from 14 gauge, or thinner, stainless steel that is finished to match existing automatic vending machines of a transit system. An AVT cabinet 2 that utilizes 14 gauge steel has an approximate weight of 90 lbs, and thus, is relatively easy to handle for installation purposes. In a preferred embodiment, all AVT cabinet seams are sealed to prevent the ingress of water to the internal components of the added value terminal 2.

In an alternate embodiment of the present invention, the add value terminal cabinet 2 is molded from a durable, vandal resistant, high impact plastic material to reduce cabinet weight. These materials, used in numerous consumer and industrial products, meet all UL, EMC, and environmental standards while greatly improving producibility and ease of installation due to the decrease in cabinet weight.

The AVT front panel 36, which is also the front door of the AVT cabinet 2, contains all of the components and basic instructions required for a patron to initiate and complete a transaction. The front panel components of a preferred embodiment include a patron display 18, selection buttons 6, a fare card entry bezel 10, a contactless smart card reader 28, a debit/credit card reader 26 and PIN pad 22, a printer receipt cup 24, an audio jack 30, bezels 40 with text 20 and Braille 32 instructions, and a security mirror 16.

The commuter/patron interfaces of a preferred embodiment are mounted to the front door 36 that is removable or is hinged open to allow access to all internal components of the added value terminal. The front door 36 of a preferred embodiment includes a front door hinge 38 located on the left side of the AVT cabinet 2 that allows the front door 36 to be hinged open. The front door 36 includes two high security locks 4, 12 to lock the front door 36 securely to the AVT cabinet 2 frame. The upper high security lock 4 and the lower high security lock 12 of the preferred embodiment utilize a single key. Alternate embodiments utilize separate keys for each lock 4, 12. The AVT cabinet 2 of the preferred embodiment is designed to be mounted either to a pedestal, a pillar, or directly to a wall, and is designed to have an overall appearance that matches the appearance of existing automatic vending machines. For example, an embodiment of the present invention includes one or more flat-plated, ceramic-coated colored steel plates 40 with raised character text 20 and Braille 32 information, similar to an AVM design for an existing city transit system.

Figure 2A:
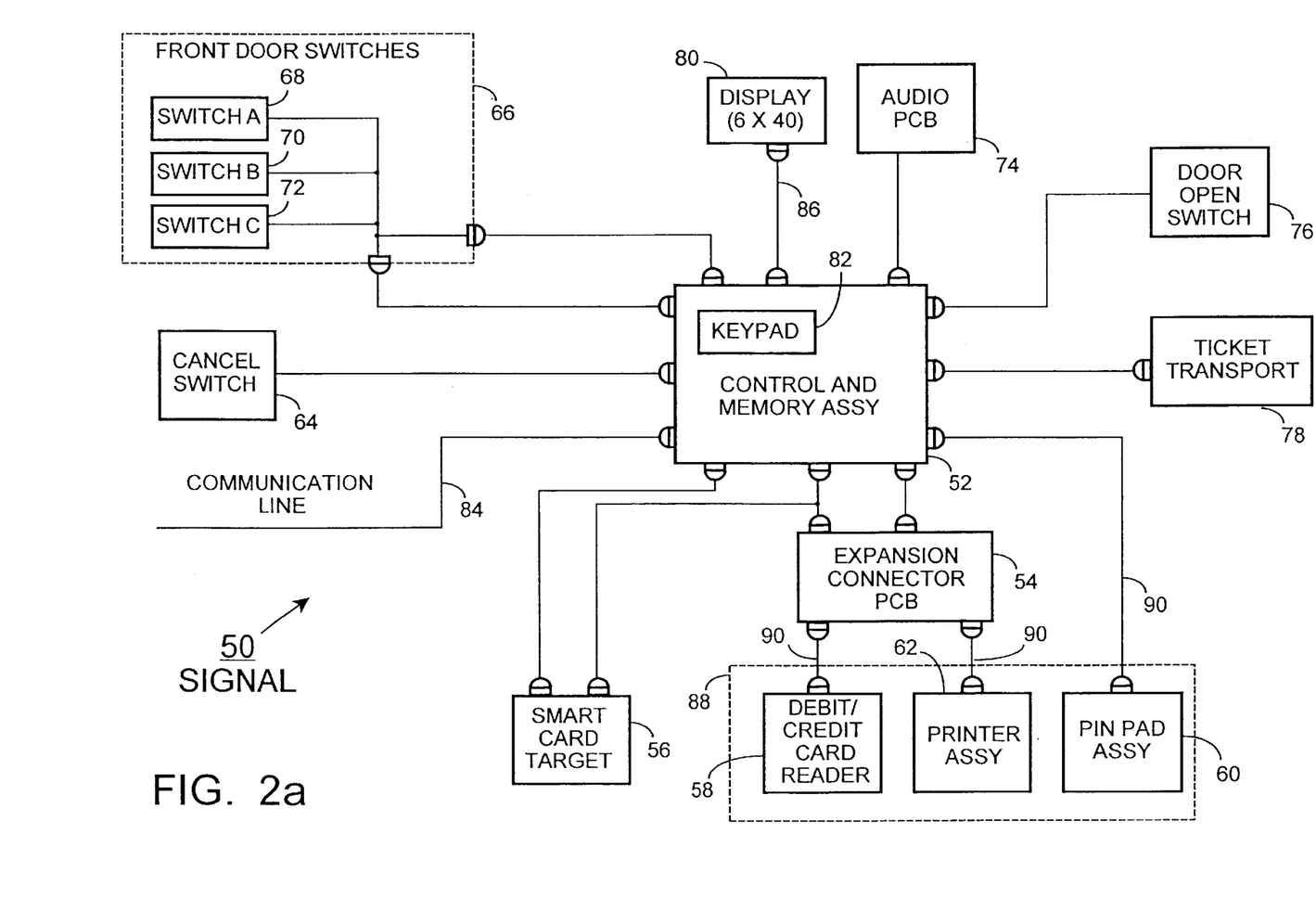
FIG. 2a is a block diagram of the signal circuitry for an add value terminal of a preferred embodiment.

The add value terminal of a preferred embodiment is designed with a user-friendly interface for the purpose of minimizing the time that commuters/patrons spend using the automatic fare collection equipment. The AVT cabinet 2 includes a display 18 that is mountable on the cabinet front door 36 for displaying option prompts, as well as information regarding fares, present card value, and added card value. Referring to FIG. 2a illustrating the signal block diagram 50 of the present invention, the display 80 of a preferred embodiment is a six line by forty (6×40) character alphanumeric display. The display assembly 80 of a preferred embodiment utilizes a vacuum fluorescent display (VFD) module that displays the ASCI character set. The display 80 is controlled by the control and memory card assembly 52 through a parallel interface 86. The add value terminal generates and displays messages and instructions on the display 80 to guide the patron through a transaction. The patron display 18 can also be used to scroll text messages, e.g. advertisements and announcements, across the screen while the add value terminal 2 is idle. Messages may be downloaded to the add value terminal 2 via an area controller, or locally via a laptop or handheld personal computer.

Referring back to FIG. 1, the display options are chosen by depressing one of several selection buttons 6 that are mounted beside the display 18 to provide a simple but rugged, easy-to-use menu selection mechanism for patron operation. The preferred embodiment utilizes three selection buttons 6 located to the right of the display 18. These buttons are multi-functional depending upon the patron instructions displayed on the screen. Another embodiment incorporates any number of buttons 6 into the design as required by the specific application and/or prompting software. A cancel button 8 is provided to end a transaction at any time. As shown in FIG. 2a, the cancel button 64 is connected directly to the control and memory card assembly 52 to reset the added value terminal to a pre-determined state. Other embodiments of the present invention incorporate touch screen display technology that eliminates the need for selection buttons 6 or that serves as a back up user interface for extended mean cycle between failure (MCBF). The preferred embodiment utilizes stainless steel selection buttons 6 for use in an automatic fare collection environment that is often exposed to moisture and condensation.

Figure 3:
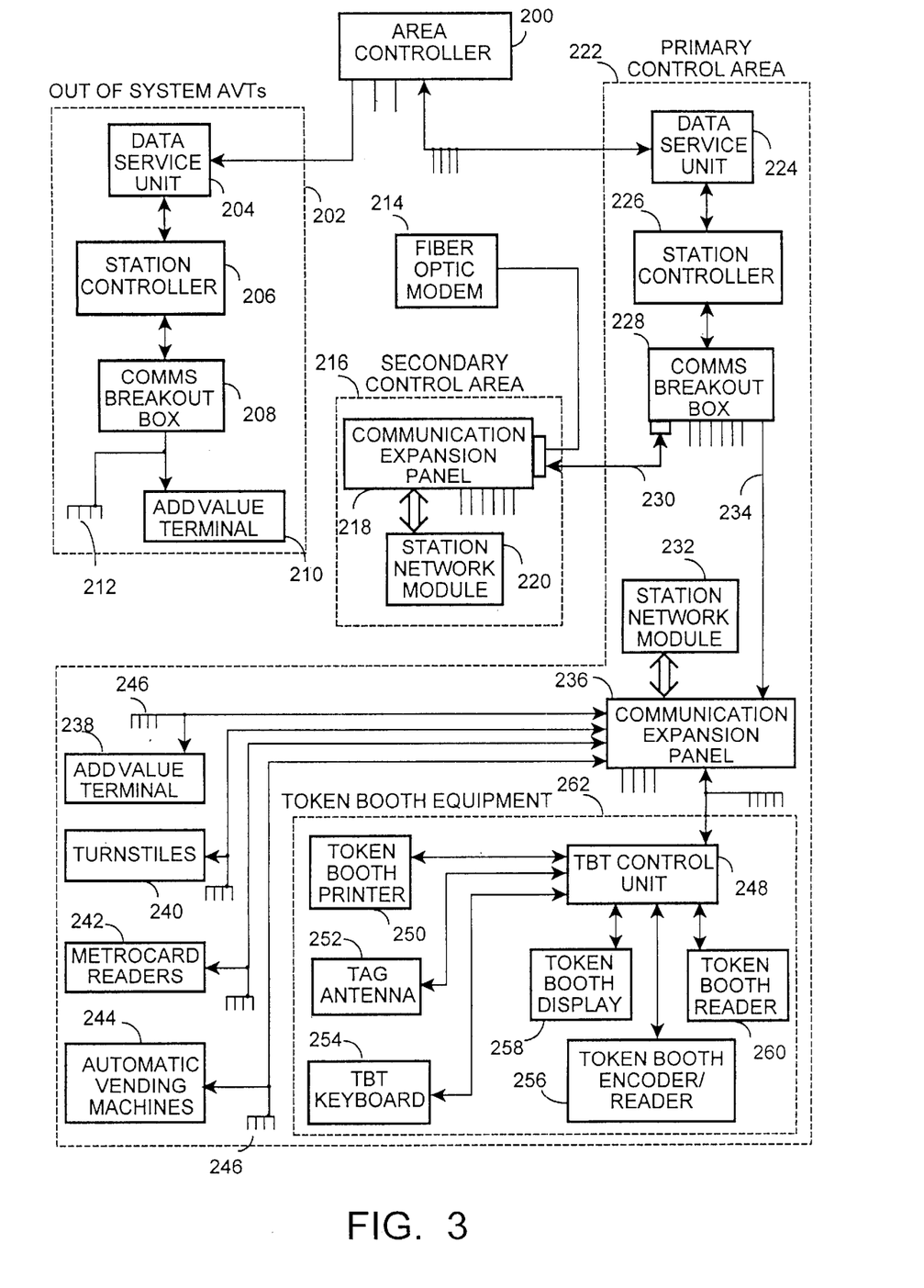
FIG. 3 is a block diagram of add value terminals included in the automatic fare collection equipment of an existing transit system.

As shown in FIG. 2a, the control and memory card assembly 52 controls the operation of the add value terminal and communicates transactions and status to the station controller via a station control communication line 84. The control and memory assembly 52 of the preferred embodiment may be chosen to be identical to the control and memory circuit card assembly used throughout the existing transit system. In a preferred embodiment, the memory contains at least 3 Megabytes of battery-backed memory, configured as six 512K×8 SRAMs, for storage of status, audit, and transaction information. The AVT 2 has a capability of storing up to five days of data to protect against the possibility of data loss due to a temporary unavailability of the station controller 226 as shown in FIG. 3.

A debit/credit module 88, as shown in FIG. 2a, of the add value terminal provides means of payment using a credit or debit card. The debit/credit module 88 of the preferred embodiment includes a debit/credit card reader 58, a pin pad assembly 60 and a printer assembly 62 that are controlled by a control and memory card assembly 52 through serial communication links 90 and an expansion connector circuit card 54.

The debit/credit card reader 58 of the add value terminal of a preferred embodiment may be chosen to be identical to a debit/credit card reader used in an existing city transit automatic vending machine. The use of identical parts lowers production costs and minimizes inventory count for replacement parts. The debit/credit card reader 58 of a preferred embodiment is connected to the control and memory circuit card assembly 52 through an expansion connector circuit card 54. Referring to FIG. 1, the debit/credit card reader 26 is a manually operated insertion device that can read magnetic stripe data. The reader 26 has fully enclosed, vandal resistant electronics and switches. The debit/credit card reader 26 of a preferred embodiment is capable of accepting standard size (2.125"×3.375") cards, such as Visa and MasterCard per ISO 7810. The debit/credit card reader 26 shown in FIG. 1 accepts cards horizontally and is capable of reading any track at 75 or 210 BPI data during removal of the card. Other embodiments of the present invention may utilize a card reader that is designed into the add value terminal to accept cards vertically. The debit/credit card reader 26 of a preferred embodiment is designed such that the customer can continually grasp the card and the card can be withdrawn at any time.

The add value terminal personal identification number (PIN) pad assembly 60, shown in FIG. 2a, may also be identical to a PIN pad utilized in the existing transit system that incorporates the use of the added value terminal. The PIN pad is connected to the control and memory circuit card assembly 52 through a serial communication link 90. Referring back to FIG. 1, the PIN keypad 22 is a twelve key unit in a standard handset configuration. A Braille dot on the number "5" key indicates the relationship of the keys for the visually impaired. The push-button keys 42 provide tactile feedback to the customer, and are sealed to protect the electronics inside the keypad housing 44. The push-button keys 42 and the keypad housing 44 of a preferred embodiment are made from durable, vandal resistant, stainless steel. To prevent vandalism, the PIN keypad 22 is only removable from within the add value terminal 2.

Referring to FIG. 2a, the printer assembly 62 of a preferred embodiment is connected to the control and memory card assembly 52 through an expansion connector circuit card 54 and serial communication link 90. The printer assembly 62 issues receipts for patron transactions and for audit reports to authorized personnel as required. The printer assembly 62 of a preferred embodiment is a thermal unit capable of printing ⅛-inch high characters, various fonts and graphics. A paper roll utilized in the printer assembly 62 of the preferred embodiment typically provides approximately 950 receipts at 4-inches in length. The printer assembly 62 of the add value terminal is designed to maximize the size of the receipt roll, thereby reducing the frequency of paper roll servicing. The printer assembly 62 of an alternate embodiment provides easy access to the receipt paper without exposing the electronics. The printer assembly 62 includes sensors to detect stack low and paper jam conditions. The printer assembly 62 status is monitored by the control and memory circuit card 52 which in turn sends an appropriate status message to an area controller through area communications lines 84. Replacing paper and clearing fare card jams is accomplished by fingertip maintenance.

The printer assembly 62 utilizes an internal controller printed circuit board to optimize print head and mechanism control, power management, print speed and quality. Referring to FIG. 1, if the supply of receipt paper is exhausted, the patron is so advised on the patron display 18. The patron is also prompted to indicate whether he or she wishes to continue the transaction without a receipt. Upon completion of printing, a receipt is cut and deposited in a receipt cup 24. The printer assembly 62 of a preferred embodiment provides smudge proof receipts so that the receipt is readable despite unfavorable operational conditions. Referring to FIGS. 1 and 2, a fare card is inserted into the add value terminal 2 through a fare card or transport entry bezel 10. The ticket transport 78 reads data from the magnetic strip of the fare card, writes data to the fare card, and/or verifies the currently stored value and other available information on a fare card. The ticket transport 78 sends/receives data from the control and memory circuit card assembly 52. In a preferred embodiment of the present invention, if a fare card fails to verify after writing, the ticket transport 78 will make three additional attempts to properly encode the fare card before returning it to the patron. Appropriate messages are displayed on the patron display 18 indicating successfully completed transactions or that an error condition exists with a suggestion to contact customer service. A message is transmitted to an area controller after each fare card transaction.

The add value terminal 2 of a preferred embodiment also includes an audio circuit card 74 having a voice synthesizer. The audio circuit card 74 creates a computerized voice from an ASCII text input. An audio filter reduces noise and an amplifier increases audio output power. The audio circuit card 74 is connected to and controlled by the control and memory card assembly 52. As shown in FIG. 1, a standard ⅛-Inch audio jack 30 is provided on the add value terminal 2 front panel for privacy when listening to the information, instructions, and prompts. Audio capability is provided on the add value terminal 2 to maintain consistency with existing automatic vending machines of transit systems such as those available in the New York City Transit automatic vending machines. The audio circuit card 74 of the present invention may be identical to the audio card utilized in existing transit automatic vending machines to minimize production and installation costs and inventory count.

The add value terminal 2 of a preferred embodiment includes a contactless smart card reader 28 for transit systems that utilize contactless smart cards. The smart card target assembly 56, as shown in FIG. 2a, provides the means for the passengers to add value to their contactless smart cards. The smart card target assembly 56 communicates directly with the control and memory circuit card 52 through an RS-422 port. The contactless smart card reader 28 of a preferred embodiment has the capability to read, write, and verify a smart card utilizing any of the contactless smart card communication protocols that are known in the art. This capability is particularly desirable for add value terminals 2 that are available outside of a transit area, such as in a grocery store, where the terminal is used to add value to fare cards of various transit links that utilize varying smart card communication protocols.

As shown in FIG. 1, the add value terminal 2 includes a security mirror 16 that provides the patron with a view of anyone approaching from behind. In a preferred embodiment of the present invention, the security mirror also serves as a cover plate for a security camera that utilizes a dedicated line to a video recorder that is located outside of the added value terminal 2.

Figure 2B:
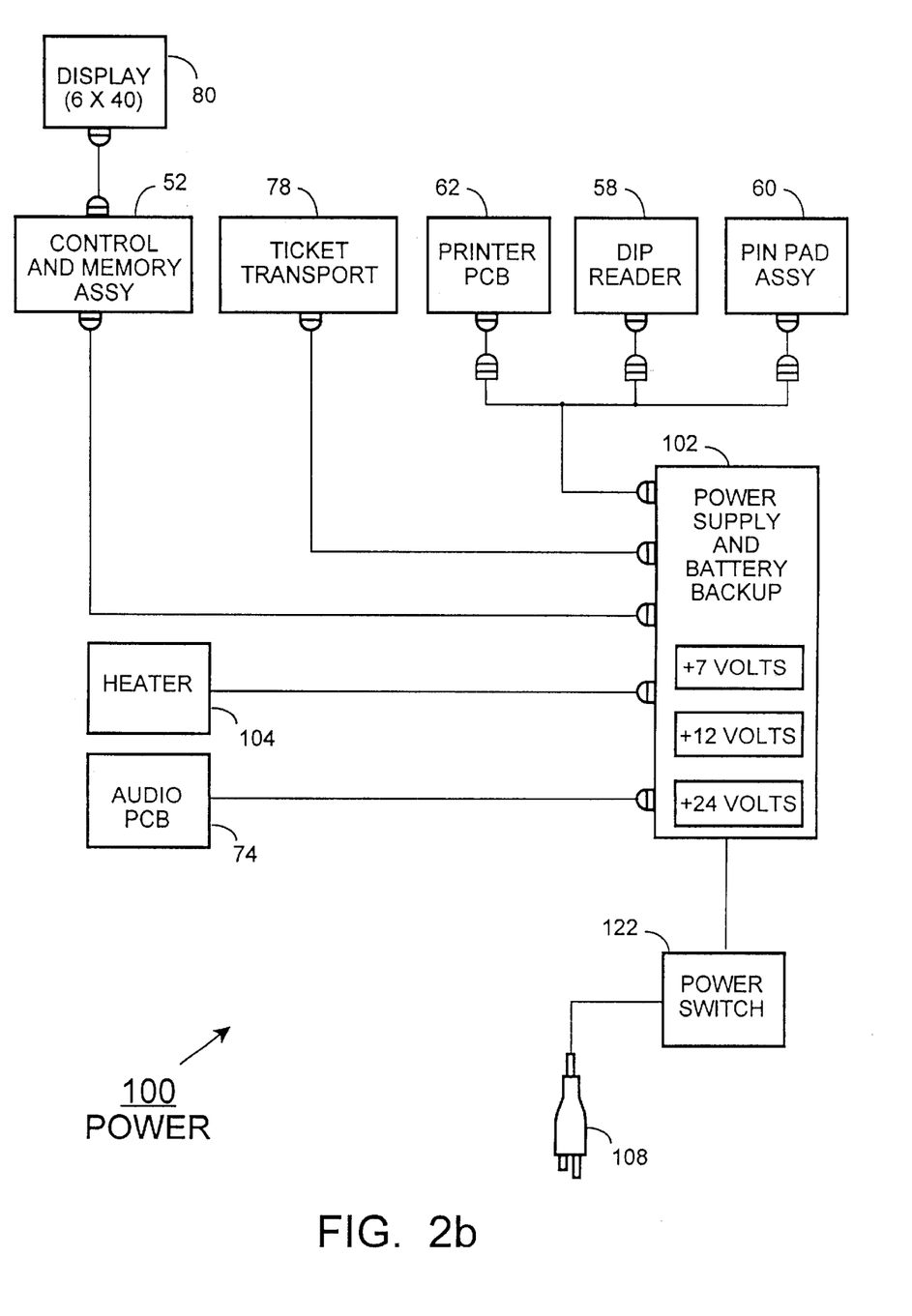
FIG. 2b is a block diagram of the power circuitry for a terminal of a preferred embodiment.

FIG. 2b illustrates a power block diagram 100 for a preferred embodiment of the present invention. The add value terminal utilizes a multiple output DC power supply and battery backup 102 which provides the various DC voltages to all internal components. The power supply requires a 120V, 60 Hz input represented by an AC plug 108. The add value terminal also requires a 10 Amp, single phase AC service connection at time of installation. A single power switch 122 located inside the add value terminal cabinet removes all power. The battery backup of the preferred embodiment provides sufficient operating power to complete a present transaction for a maximum of 30 seconds. If the transaction is not completed within 30 seconds, the add value terminal will cancel the transaction and return the card to the patron.

A heater 104 is provided to maintain an acceptable operating temperature for the components within the add value terminal. The add value terminal is designed to withstand the environmental operating conditions encountered in the transit environment, outdoor environments exposed to wind driven rain and snow, and other out-of-system environments such as hotel lobbies and grocery stores. The add value terminal of a preferred embodiment is designed to perform without failure after exposure to the environmental conditions resulting in operating temperatures ranging from −10 to 120 degrees F., and operating humidity ranging from 20% to 97% non-condensing.

Referring to FIG. 2a, a keypad 82 and the front panel patron display 80 are provided to aid in the isolation of the add value terminal fault conditions during maintenance procedures. During a test mode of a preferred embodiment, terminal status data including audit register data, machine mode, location identification, machine number, time, and date as well as internal diagnostic results are displayed on the patron display 80. As shown in FIG. 3, all information is transmitted to the station controller 226 then to the area controller 200. The add value terminal of the preferred embodiment includes diagnostic procedures to assist the maintenance technician with the performance of repair actions.

Referring again to FIG. 2a, the add value terminal of a preferred embodiment also includes status and maintenance switches connected to the control and memory circuit card assembly 52. A door open switch 76 informs the control and memory circuit card 52 that the front door 36, as shown in FIG. 1, has been opened indicating a possible security breach. The control and memory card assembly 52 sends the switch status to the station controller to alert personnel of the possible security breach. Operation of the add value terminal is suspended unless a maintenance log-in is properly executed. In a preferred embodiment of the present invention, front door switches 66, including switch A 68, switch B 70, and switch C 72, are also provided for terminal identification purposes and diagnostic procedures.

The add value terminal 2 is designed to conform with the American with Disabilities Act (ADA) requirements, Section 4.34 of the U.S. Federal Government ADA Accessibility Guidelines for Buildings and Facilities. Specifically, the AVT 2 of a preferred embodiment is installed so that its maximum reach height does not exceed 54 inches (137 cm) from the floor, the maximum reach depth does not exceed 5 inches (12.7 cm). In addition, raised letter text 20 is a minimum of ⅝ inches tall (1.59 cm) and is raised 0.030 inches (0.076 cm) for tactile feel with contrasting color to the background. Braille 32 is included next to all patron interfaces to facilitate use by the visually impaired. In addition to the above, a digital voice synthesizer 74 as shown in FIG. 2a is used to create a computerized voice for prompting and instructing the patron. Referring to FIG. 1, a patron accesses AVT audio output via an audio jack 30 utilizing a patron-supplied headset.

The primary function of the add value terminal is to add value or time to a fare card using a credit or debit card. Referring to FIG. 1, the commuter/patron utilizes the add value terminal 2 to add value to either a magnetic strip fare card or a smart card. Fare cards that utilize magnetic strips are inserted into the fare card bezel 10. Communication between a contactless smart card and the add value terminal 2 is accomplished by waving a contactless smart card past the smart card reader 28. All patron interaction is accomplished using the selection buttons 6, the cancel button 8, the PIN keypad 22, and the patron display 18.

In the preferred embodiment, a patron display 18 prompts the passenger to insert a fare card into the entry bezel 10 as illustrated by a depiction of the fare card 34 on the face of the add value terminal 2. In other embodiments, the magnetic strip fare cards are inserted according to an orientation of a magnetic strip reader internal to the AVT 2. After the patron has inserted the fare card, the patron display 18 shows the current period and card expiration dates, the remaining value, the number of rides remaining, and the upgrade status of the card. The patron display 18 prompts the patron to select the add value or add time transaction. The patron makes the appropriate selection using the selection buttons 6, and selects the desired value or time. The patron display 18 is updated to the selected value/time to be purchased. The display 18 then prompts the patron for the payment method to be used, and a choice of either a credit or debit (ATM) card is displayed. The patron selects the method of payment by depressing the appropriate selection button 6, and the display 18 prompts the patron to insert the debit or credit card into the debit/credit card reader 26. If a debit card is used, the patron is requested to enter a 4-digit personal identification number (PIN) number on the PIN pad 22. An authorization request is then sent to the bank via the station controller 226 as shown in FIG. 3, through the Area controller 200 that is connected to an existing bank authorization network. Prior to updating the fare card, the display prompts the patron to select whether a receipt is desired. Authorization is received from the bank and is communicated to the add value terminal 238 via the station controller 226 from the area controller 200. Referring to FIG. 1, the fare card is then encoded with the required information and returned to the patron via the same fare card bezel 10. If requested, a receipt is dispensed in the printer receipt cup 24. The patron display 18 then shows the complete transaction information including the remaining value, period and card expiration dates, remaining rides, and upgrade status. The patron may cancel the transaction process at any time by pressing the cancel button 8. If the patron cancels the transaction after authorization has been received or the add value terminal 2 cannot issue or encode the fare card, the AVT 2 generates a reversal transaction and transmits it to the area controller 200.

The AVT 2 of a preferred embodiment is designed to achieve an mean cycle between failure (MCBF) of at least 30,000, where a cycle is defined as the completion and/or cancellation of a transaction with a receipt. Cancellation occurs when transaction processing cannot be completed and the fare card is returned to the patron, or when a transaction is terminated by the patron using the cancel button 8. The AVT 2 transactions that may be performed by the patron include add value and print debit/credit receipt, add value without printing debit/credit receipt, add time and print debit/credit receipt, and add time without printing debit/credit receipt. Add value terminal 2 MCBF is based upon a receipt being generated for each transaction. MCBF improves if patrons choose not to have a receipt printed as a result of a debit/credit transaction.

The added value terminal 2 of a preferred embodiment is compact in order to simplify installation and maintenance. The add value terminal 2 may be installed in stations or locations where a full function automatic vending machine is not desired or warranted. As shown in FIG. 3, the add value terminal 238 may be installed into an existing transit automatic fare collection system. In a preferred embodiment, the add value terminal utilizes many of the components of the transit system to maintain compatibility with the existing system. Referring to FIG. 2a, components that may be identical to the existing transit system components include the control and memory card assembly 52, the receipt printer assembly 62, the debit/credit PIN pad assembly 60, the debit/credit card reader 58, the Audio PCB 74, the intrusion switch 76, and the high security locks 4, 12 as shown in FIG. 1.

FIG. 3 illustrates a typical transit system network that includes a primary control area 222, a secondary control area 216, and out-of-system add value terminals 202. The out-of-system add value terminal 210 and the in-system add value terminal 238 is designed to communicate to the area controller 200 via station controllers 206, 226 within the automatic fare collection network. Information transmitted between the area controller 200 and add value terminals 210, 238 includes status messages, audit registers, fare card update transaction data, debit/credit transaction data, fare validation tables and other relevant parameters, minimum/maximum purchase values, and negative lists. Additional add value terminal status messages are generated and sent to the area controller 200 including battery low, paper jam, paper low/out, transport error, power fail, and door open.

Out-of-system add value terminals 210, that may be located in outlets such as supermarkets and chain stores, offer availability of an add value terminal 210 in environments that eliminate much of the potential for petty theft and other security concerns. Fare cards are often available through merchant locations wherein the merchant receives a commission according to a commission schedule for pre-valued cards. Fare card customers benefit from the availability of AVTs by not having to wait in lines behind customers with multiple purchases when they wish to add value or time to their fare card. Out-of-system locations may include, but not be limited to hotels, air-ports, major buildings, shopping malls/centers, post offices, hospitals, bus terminals, libraries, housing complexes, and senior citizen complexes.

As shown in FIG. 3, the out-of-system add value terminal 210 is connection to a communications breakout box 208. Expansion ports 212 for additional system equipment including add value terminals are available for connection to the communication breakout box 208. The communications breakout box 208 is connected to an out-of-system station controller 206 that is connected to the area controller 200 via a data service unit 204.

The area controller 200 of the preferred embodiment is connected to the primary control area 222, and out-of-system control area 202 utilizing conditioned four-wire digital lines or fiber optic networks. The preferred embodiment specifies a 9,600 Baud rate. The primary control area 222 includes station controller 226 connected to the area controller 200 via a data service unit 224. The station controller 226 is connected to a communications breakout box 228 that has several port connections including a connection to a communication expansion panel 218 of a secondary control area 216, and a communication expansion panel 236 of the primary control area. A fiber optic communication line 230 connects the communications breakout box 228 with the secondary control area 216. A fiber optic modem 214 is also connected to the secondary control area 216. The expansion panel 218 of the secondary control area 216 is further connected to a station network module 220.

Communications from the communications breakout box to the communication expansion panel 236 of the primary control area 22 is accomplished utilizing an RS-232 connection 234. A bi-directional communication channel connects a primary control area station network module 22 to the communication expansion panel 236. In a preferred embodiment, a communication expansion panel 236 connected to one of the ports of the communications breakout box 228 has eight RS-422 synchronous duplex serial ports with a 9,600 or greater baud rate. A first port of the eight RS-422 ports having expansion capability 246 is connected to an add value terminal 238. Transit system turnstiles 240, fare card readers 242, and automatic vending machines 244 are also connected to the available serial ports of the communication expansion panel 236. The communication expansion panel 236 also serves as a connection between the station controller 226 and the token booth control unit 248 of the token booth equipment 262. The token booth control unit 248 controls and monitors a token booth printer 250 a TAG antenna 252, and token booth keyboard 254, a token booth display 258, and token booth reader 260, and a token booth encoder/reader 256.

Other embodiments and modifications of the present invention will occur readily to those of ordinary skill in the art in view of these teachings. Such persons will appreciate the symmetries among the various embodiments illustrated above and understand that their elements may be arranged in other ways to produce similar results. Therefore, this invention is to be limited only by the following claims, which include all such other embodiments and modifications when viewed in conjunction with the above specification and accompanying drawings.

We claim:

1. A terminal in communication with a transit station controller for adding value to fare cards utilizing credit and debit accounts only, the terminal comprising:
    a cabinet having a front panel interface, said front panel interface comprising:
        a patron display for displaying information and instructions to a patron;
        a plurality of selection buttons adjacent the patron display for selecting the displayed options;
        a fare card entry bezel for accepting contact-type smart cards;
        a contactless smart card target and reader;
        a debit/credit card reader for providing means of payment using a debit/credit card; and
        a pin pad adjacent the debit/credit card reader for entering debit/credit card pin numbers; and
    a plurality of internal components positioned inside the cabinet, said plurality of internal components comprising:
        a control and memory assembly for controlling said front panel interface, said control and memory assembly connected to said transit station controller through serial communication links.

2. The terminal of claim 1, wherein the front panel interface further comprises a plurality of bezels having text and Braille instructions.

3. The terminal of claim 1, wherein the front panel interface further comprises means to provide audio instructions to the patron.

4. The terminal of claim 1, further comprising means for issuing a new or recycled smart card.

5. The terminal of claim 1, wherein the front panel interface further comprises a printer receipt cup connected to a printer assembly positioned inside the cabinet for providing a transaction receipt.

6. The terminal of claim 1, wherein the front panel interface further comprises a security mirror for providing the patron with a view of an approaching person, the security mirror serving as a cover plate for a security camera that utilizes a dedicated line to a video recorder located external to the terminal.

7. The terminal of claim 1, wherein the front panel interface has means for hinging open to allow access to the plurality of internal components of the terminal.

8. The terminal of claim 7, further comprising an upper high security lock and a lower high security lock for locking the front panel interface to the cabinet.

9. The terminal of claim 1, wherein the patron display provides a means for displaying advertisements when the terminal is not in use.

10. The terminal of claim 1, wherein the patron display further comprises a touch screen display.

11. The terminal of claim 1, wherein the control and memory assembly comprises a battery-backed memory for storage of status and transaction information.

12. A method of adding value to fare cards, said method comprising the steps of:
    providing a terminal in communication with a transit station controller for adding value to the fare cards utilizing credit and debit accounts only;
    displaying instructions on said terminal for prompting a patron;
    reading a smart card utilizing one of a contact smart card reader and a contactless smart card reader;
    reading a debit/credit card utilizing a debit/credit card reader;
    communicating with the transit station controller for authorizing a debit/credit card transaction; and
    writing a new value to the smart card.

13. The method of claim 12, wherein the step of reading a smart card comprises the step of inserting a contact smart card into the contact smart card reader.

14. The method of claim 12, wherein the step of reading a smart card comprises the step of moving a contactless smart card past a target of the contactless smart card reader.

15. The method of claim 12, wherein the step of writing a new value to the smart card comprises the step of moving a contactless smart card past a target of the contactless smart card reader.

16. The method of claim 12, further comprising the step of providing a plurality of bezels having text and Braille instructions.

17. The method of claim 12, further comprising the step of utilizing audio instructions to prompt the patron.

18. A transit system network for providing access to fare-paid only areas, the system comprising:
    an area controller;
    an in-system control area in communication with the area controller, the in-system control area comprising:

at least one in-system station controller;

at least one in-system communication expansion panel connected to the at least one in-system station controller; and at least one in-system add value terminal connected to the at least one in-system communication expansion panel for conducting non-cash transactions, the at least one in-system add value terminal having means for adding value to a smart card utilizing a debit/credit card; and an out-of-system station area in communication with the area controller, the out-of-system station area comprising:

at least one out-of-system station controller; and at least one out-of-system add value terminal connected to the at least one out-of-system station controller for conducting non-cash transactions, the at least one out-of-system add value terminal having means for adding value to the smart card utilizing the debit/credit card.

19. The transit system network of claim 18, wherein the in-system station area comprises a train station.

20. The transit system network of claim 18, wherein the out-of-system station area comprises a grocery store.

\* \* \* \* \*